US012462765B2

(12) United States Patent
Pasca

(10) Patent No.: US 12,462,765 B2
(45) Date of Patent: Nov. 4, 2025

(54) DEVICE, METHOD FOR MANUFACTURING A DISPLAY DEVICE, AND RESPECTIVE DISPLAY DEVICE

(71) Applicant: Continental Automotive Technologies GmbH, Hannover (DE)

(72) Inventor: Andrei Pasca, Timisoara (RO)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/659,620

(22) Filed: May 9, 2024

(65) Prior Publication Data

US 2024/0379070 A1 Nov. 14, 2024

(30) Foreign Application Priority Data

May 12, 2023 (EP) .................................... 23465510

(51) Int. Cl.
*G09G 3/34* (2006.01)

(52) U.S. Cl.
CPC ... *G09G 3/3426* (2013.01); *G09G 2320/0233* (2013.01); *G09G 2320/0666* (2013.01); *G09G 2360/16* (2013.01); *G09G 2380/10* (2013.01)

(58) Field of Classification Search
CPC .......................................... G09G 3/3406–3426
See application file for complete search history.

(56) References Cited

U.S. PATENT DOCUMENTS 8,115,417 B2 * 2/2012 Zhang .................. G09G 3/3426 315/307
8,378,958 B2 * 2/2013 Chen ...................... H05B 45/28 345/88
8,390,562 B2 * 3/2013 Chen .................... G09G 3/3413 345/88
8,575,865 B2 * 11/2013 Chen ................. G02F 1/133603 315/307
9,047,825 B2 * 6/2015 Matsui ..................... G09G 3/20
12,100,364 B2 * 9/2024 Wu ........................ G09G 3/342
2006/0103621 A1 5/2006 Feng
2007/0046485 A1 3/2007 Grootes et al.
(Continued)

OTHER PUBLICATIONS

Examination Report dated Jun. 22, 2023 from corresponding European patent application No. 23465510.8.
(Continued)

*Primary Examiner* — Gene W Lee
(74) *Attorney, Agent, or Firm* — COZEN O'CONNOR

(57) ABSTRACT

A method, a computer program code, and an apparatus for processing an image to be displayed by a display device, with a local dimming backlight unit that provides essentially white light is disclosed. The disclosure is further related to a method for manufacturing a display device, a corresponding display device, and a motor vehicle with such a display device. In a first step, an image to be displayed is received. Driving values for light sources of the local dimming backlight unit are then determined based on the image to be displayed. Based on the driving values, a backlight appearance is determined. Pixel values of the image are then adjusted based on the backlight appearance. Information related to white points of the light sources is taken into account in the step of adjusting pixel values of the image, which may be retrieved from a map stored in a memory.

14 Claims, 7 Drawing Sheets

(56) References Cited

U.S. PATENT DOCUMENTS

| | | | | |
|---|---|---|---|---|
| 2009/0160756 | A1* | 6/2009 | Van Beek | G09G 3/3413 345/102 |
| 2011/0148940 | A1 | 6/2011 | Byun et al. | |
| 2014/0210802 | A1* | 7/2014 | Myers | G09G 3/3426 345/207 |
| 2022/0415271 | A1 | 12/2022 | Lin et al. | |
| 2024/0105131 | A1* | 3/2024 | Tann | G09G 3/342 |

OTHER PUBLICATIONS

Search Report dated Aug. 3, 2023 from corresponding European patent application No. 23465510.8.

* cited by examiner

DEVICE, METHOD FOR MANUFACTURING A DISPLAY DEVICE, AND RESPECTIVE DISPLAY DEVICE

CROSS REFERENCE TO RELATED APPLICATION

This U.S. patent application claims the benefit of EP patent application Ser. No. 23/465,510.8, filed May 12, 2023, which is hereby incorporated by reference.

TECHNICAL FIELD

The present disclosure is related to a method, a computer program code, and an apparatus for processing an image to be displayed by a display device, in particular by a display device with a local dimming backlight unit that provides essentially white light. The disclosure is further related to a method for manufacturing a display device, a corresponding display device, and a motor vehicle with such a display device.

BACKGROUND

Backlight units for display devices are often based on light guides, into which the light from several light-emitting diodes (LED) is coupled. The light propagates in the light guide by total reflection and is coupled out again with the help of microstructures on the light guide, so that a homogeneous light distribution is created. This design enables very compact and efficient illumination of displays.

As an alternative to backlight units that are based on light guides, so-called matrix backlight units may be used. Matrix backlight units use a large number of light sources arranged in a matrix to generate light. The light sources are arranged on a printed circuit board, which is mounted on a back plate. Matrix backlight units typically use a metallic back plate and a suitable reflector.

More and more display applications in the automotive field start using local dimming backlight units. Reasons for this are, among others, a reduced power consumption, an improved contrast, and an improved thermal behavior of the display device in high brightness environments.

On an abstract level, a liquid crystal display (LCD) with a local dimming backlight unit consists of a segmented backlight unit, an LCD panel, and a processor that analyzes the images to be displayed and derives driving values for the segmented backlight unit and for the display panel.

The segmented backlight unit is constructed in such a manner that several distinct zones can be controlled individually in accordance with the contents of the image that is to be displayed. In particular, the backlight regions corresponding to brighter image areas will have a higher brightness, while regions corresponding to dark or black image areas will have a lower brightness or will even be turned off completely.

For example, US 2011/0148940 A1 discloses a driving method for local dimming of an LCD device. A frame is divided into a plurality of blocks corresponding to a plurality of dimming blocks of a backlight unit. An average value of each color in a block by analyzing image data of the block and determining, for the block, a local dimming value of each color corresponding to the average value of the color. A maximum value is detected among the average values of respective colors in the block and a luminance local dimming value corresponding to the maximum value in the block is determined. A plurality of LEDs corresponding to the block in the backlight unit are then driven on a color basis according to the local dimming value of each color in the block, or a color basis using the same luminance local dimming value according to whether the block is a chromatic color area or an achromatic color area.

US 2007/0046485 A1 discloses a technique for setting voltages and currents for LEDs of an LED backlight structure. In one embodiment, red LEDs are connected in series between a first voltage regulator and a first controllable current source, green LEDs are connected in series between a second voltage regulator and a second controllable current source, and blue LEDs are connected in series between a third voltage regulator and a third controllable current source. After all the LEDs are mounted on a printed circuit board, each voltage regulator is controlled so that there is a minimum voltage drop across the current source to minimize energy dissipation by the current source. Furthermore, the current sources are controlled to balance the three colors to achieve a target light output of the board using a light detection chamber. The control values used to achieve the target light characteristics are then stored in a memory on the board.

An important component of a display with a local dimming backlight unit is the processor that generates the required values for the backlight unit and for the display panel. The processor analyzes the image to be displayed and, based on the pixel values, in particular their brightness level, determines the necessary appearance of the backlight unit.

Another important role of the processor is to adjust the image that is sent to the display panel in such a way that the combination of the appearance of the backlight unit and the image that is effectively displayed on the display panel is basically identical with the intended target image to be shown. If this step is missing, the appearance of the resulting image will differ substantially from the appearance of the target image, which might be considered unacceptable.

An important driver for the price of a locally dimmed display is the placement of the LEDs in the backlight unit. The price is driven by several contributing factors. One factor is the rather high number of LEDs that must be placed. This number can range form hundreds to even thousands of LEDs, which need to be placed at specific locations with high accuracy. A further factor is that, unlike standard printed circuit board components, where the components are typically tightly packed around critical components, the LEDs on the backlight unit are spread over a large area. This limits the speed with which the components can be placed by the pick and place machines on the assembly lines, as a large fraction of the time is spent moving from the component pick position to the component placement position and back.

An important aspect of display panels, especially for premium products, is the uniformity of the appearance of the display panel. This uniformity of the appearance refers not only to the brightness of the panel, but also to the color reproduction and the white point. For display applications with local dimming backlight units, the uniformity of the white point poses a challenge from the manufacturing point of view. Unlike edge-lit display applications, where a relatively low number of LEDs is required, a locally dimmed display has many more LEDs, up to the range of thousands. The uniformity requirement translates into a requirement of all LEDs being from the same color bin. If some LEDs come from a different color bin, the display area illuminated by them will exhibit a slightly different color, which is easily noticeable at the edges between the regions illuminated by LEDs with different color bins. This is also the case if the backlight unit is constructed using monochromatic LEDs, e.g., LEDs emitting blue or violet light, combined with a light conversion foil that covers the entire display area, as the quality of the generated light depends not only on the light conversion foil, but also on the incoming monochromatic light, i.e., on its dominant wavelength, as a fraction of the generated light output comes directly from the LEDs.

SUMMARY

It is an object of the present disclosure to provide solutions for further improving the perceived quality of images displayed by a display device with a local dimming backlight unit that provides essentially white light.

This object is achieved by a method for processing an image to be displayed, by a computer program code, by an apparatus, by a method for manufacturing a display device, by a display device, and by a motor vehicle. The dependent claims include advantageous further developments and improvements of the present principles as described below.

According to a first aspect, a method for processing an image to be displayed by a display device with a local dimming backlight unit that provides essentially white light comprises receiving an image to be displayed; determining driving values for light sources of the local dimming backlight unit based on the image to be displayed; determining a backlight appearance based on the driving values; and adjusting pixel values of the image based on the backlight appearance, wherein adjusting the pixel values takes into account information related to white points of the light sources.

Accordingly, a computer program code comprises instructions, which, when executed by at least one processor, cause the at least one processor to perform the following steps for processing an image to be displayed by a display device with a local dimming backlight unit that provides essentially white light comprising receiving an image to be displayed; determining driving values for light sources of the local dimming backlight unit based on the image to be displayed; determining a backlight appearance based on the driving values; and adjusting pixel values of the image based on the backlight appearance, wherein adjusting the pixel values takes into account information related to white points of the light sources.

The term computer has to be understood broadly. In particular, it also includes embedded devices and other processor-based data processing devices.

The computer program code may, for example, be made available for electronic retrieval or stored on a computer-readable storage medium.

According to another aspect, an apparatus for processing an image to be displayed by a display device with a local dimming backlight unit that provides essentially white light comprises an input for receiving an image to be displayed; a brightness computation unit for determining driving values for light sources of the local dimming backlight unit based on the image to be displayed; an appearance estimation unit for determining a backlight appearance based on the driving values; and a pixel adjustment unit for adjusting pixel values of the image based on the backlight appearance, wherein the pixel adjustment unit is configured to take into account information related to white points of the light sources for adjusting the pixel values.

According to yet another aspect, a method for manufacturing a display device with a local dimming backlight unit that provides essentially white light comprises determining information related to white points of light sources of the local dimming backlight unit; and storing the determined information in a memory.

Accordingly, a display device with a local dimming backlight unit that provides essentially white light is configured to access a memory that stores information related to white points of light sources of the local dimming backlight unit.

According to the disclosure, instead of ensuring that all LEDs come from the same color bin, information related to white points of light sources of the local dimming backlight unit is stored in a memory. This information is then used for compensating the differences in the backlight white point incurred by the usage of LEDs from different color bins. In this way, the restrictions imposed by the white point uniformity requirements on the manufacturing of the system are removed. LEDs coming from multiple color bins may thus be used without adverse effects on the quality of the final product.

The solution according to the disclosure has a plurality of benefits. Typically, the easiest solution to guarantee that all the LEDs come from the same color bin is to place them with a single pick and place arm, all from the same component reel. This solution, however, is the slowest solution because it is limited by the arm traveling times. In case several pick and place arms are used to assemble the LEDs, all reels feeding the pick and place arms must have the same color bin, since each arm is served by a different feeder. This is only possible if all the LED reels are sourced with the same color bin from the LED supplier. However, this solution is not favored by LED suppliers, as it implies tight sorting in the respective production line. As a consequence, such an approach will reflect in the LED piece price and hence, will have a high impact on the total system cost. The solution according to the disclosure allows using multiple reels without the need of sourcing all reels with the same color bin. This means that multiple pick and place arms may be used for the manufacturing of a single backlight unit, with substantial reduction of the manufacturing time and hence, increased throughput.

A further benefit is related to the number of LEDs in one reel compared to the number of LEDs that needs be placed on a given printed circuit board. For instance, assuming a reel with 3000 LEDs and a system having 1300 LEDs, if the LEDs are assembled using a single pick and place arm to guarantee that all LEDs come from the same color bin, the reel may be used for only two backlight units. This means that only 2600 LEDs may be used from a total of 3000 and the remainder of 400 LEDs, i.e., 13.3% of the LEDs, represent losses, as they cannot be used for the product. This also applies to solutions using multiple pick and place arms. Just switching to larger reels, with the idea that the percentage of unusable LEDs decreases as the total number LEDs increases, is not necessarily a solution for this problem. For example, from a reel with 5000 only 3900 LEDs may be used for a system having 1300 LEDs. This translates to 1100 LEDs, i.e., 22% of the LEDs, that need to be discarded. A possibility to mitigate this issue is to use reels with a non-standard number of LEDs. However, such a solution would be tailored for a specific project, which results in higher costs per LED, as the supplier has to prepare special reels. The solution according to the disclosure allows usage of all LEDs from a reel, substantially reducing the net LED losses, with a corresponding reduction of the per unit costs.

In an embodiment, adjusting pixel values includes individually adjusting color channels of a pixel based at least on information related to a white point of a light source associated with a respective position of the pixel. For example, if the white point given by the LED illuminating the current pixel is shifted towards the blue color, a weight for the blue channel may be generated for the current pixel that is slightly lower than one, while the weights for the green and red channels are kept constant at one. In this way, the combination of the slightly bluer backlight and the pixel with a reduced amplitude on the blue channel generates a white point value which is close to the target value. When the values of some of the color channels of a pixel are weighted with subunitary values, the transmittance of the pixel is slightly reduced. In order to maintain the brightness uniformity of the display panel, it is advantageous if also the backlight is adjusted such that the overall brightness of the current pixel is kept at the same level as the brightness of the pixels from neighboring backlight regions.

In an embodiment, a crosstalk matrix is used for taking into account white points of neighboring light sources for adjusting pixel values. The white point adjustment weights determined for the backlight area illuminating the currently processed pixel may be used directly for the adjustment of the pixel, which has the benefit of a simple circuit implementation and, hence, a low cost. Alternatively, they may be further combined with weights from neighboring areas using a crosstalk matrix. This variant produces a better uniformity of the white point, as light leakage, i.e., crosstalk, from adjacent areas is taken into consideration for the adjustment of the current pixel. This aspect is particularly relevant for neighboring backlight areas in which LEDs from different color bins are used.

In an embodiment, the information related to white points of the light sources is retrieved from a map stored in a memory. As already explained above, the color coordinates, i.e., the white points, of the LEDs of the backlight unit, depend on the respective color bins of the LEDs. Therefore, during assembly of the backlight unit or during a subsequent calibration process, a map may be generated, in which the information related to the white points of the LEDs is stored for the respective positions. This map may then be used as a basis for the white point compensation. In this way, based on the coordinates of each processed pixel, the relevant information related to the white point of the LED illuminating the processed pixel may be retrieved. Based on this information, it is the possible to determine the necessary color channel weights for the processed pixel.

In an embodiment, the information related to white points of the light sources includes calibration data, weights, or information related to color bins of the light sources. When color bins of the LEDs are stored in the map, the map can be constructed as look-up table capable of storing values with a very short word length. For instance, in case the look-up table stores words having only 2 bits, a discrimination between four distinct LED color bins is possible. An additional bit for the word extends the capabilities to eight distinct LED color bins, which will be sufficient for the vast majority of local dimming applications. The stored words are then preferably used as inputs for an additional look-up table, which makes the correspondence between the digitally encoded color bins and the required white point compensation weights or brightness adjustment coefficients. It is up to the application how to digitally encode the LED color bins into these bits from the look-up table. Of course, it is likewise to possible to directly store the compensation weights or calibration data, such as the respective color coordinates of the LEDs, in the map.

In an embodiment, one of the color bins is considered as a white point reference. In this approach, one of the LED color bins, e.g., the color bin that produces a final system white point that is closest to a desired target white point, is considered as a reference for the white point. For the remaining color bins, the white point compensation weights are determined in such a way as to bring the resulting white point of the system in those areas corresponding to the different LED color bins to the same color coordinates as the reference white point of the reference color bin. The resulting locally dimmed display thus has a white point that is determined by the LED color bin that was considered as reference.

In an embodiment, the weights result from a statistical approach. For example, based on the typical color coordinates of the different color bins, the weights are set to an average value such that, statistically, the resulting white point coincides with a desired reference white point, within some desired limits. With this approach, all LEDs from a same color bin will generate the same color compensation weights for all manufactured systems.

A motor vehicle comprises a display device according to the invention. For example, the motor vehicle may be a passenger car or a truck, or alternatively an aircraft, a rail vehicle or a watercraft.

BRIEF DESCRIPTION OF THE DRAWINGS

Further features of the present invention will become apparent from the following description and the appended claims in conjunction with the figures, wherein:

DETAILED DESCRIPTION

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random access memory (RAM), and nonvolatile storage.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that may provide those functionalities are equivalent to those shown herein.

Figure 1:
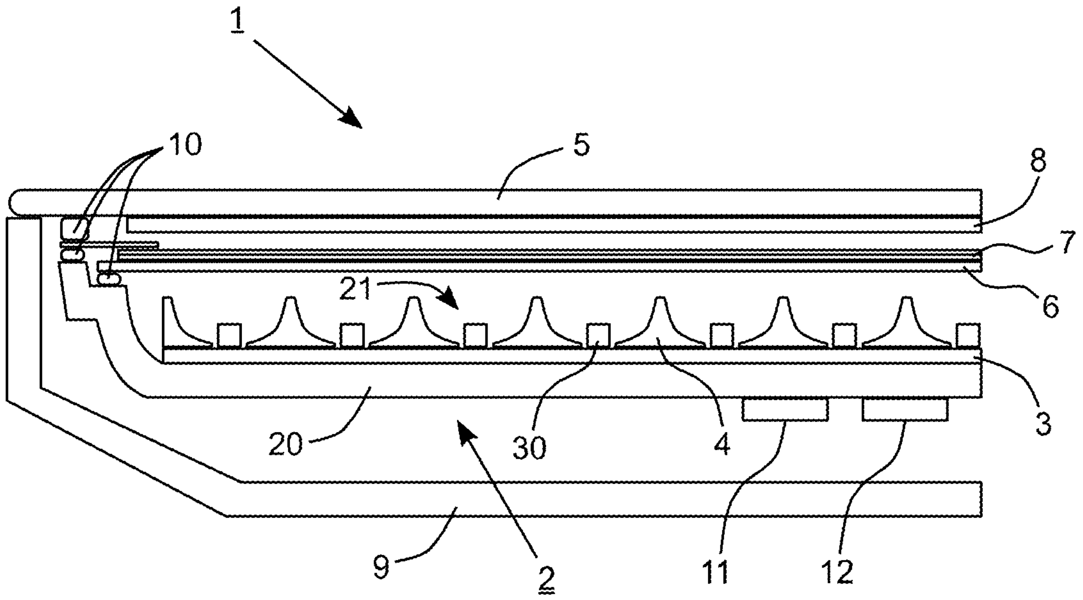
FIG. 1 schematically illustrates a cross section through a display device with a local dimming backlight unit.

FIG. 1 schematically illustrates a cross section through a display device 1 with a local dimming backlight unit 2. The display device 1 has a display panel 8, which is bonded to a front glass 5. The front glass 5 seals a housing 9 of the display device 1 from the environment. The local dimming backlight unit 2 for the display panel 8 comprises a back plate 20, which serves as a carrier element for a printed circuit board 3, on which a plurality of light sources 30 are arranged, typically light-emitting diodes. Arranged on the printed circuit board 3 is a reflector 4 with a large number of cavities 21. Each of the cavities 21 accommodates at least one light source 30. In the depicted example, a distance plate 6 carrying an optical foil stack 7 is located between the local dimming backlight unit 2 and the display panel 8. The foils of the optical foil stack 7 have the task of scattering, collecting or directing the light from the reflector 4 in such a way that the requirements for the light distribution of the local dimming backlight unit 2 are met. Typical films for light manipulation are Brightness Enhancement Films (BEF) and Light Control Films (LCF). The distance plate 6 is a transparent plate that ensures the necessary optical distance between the optical foil stack 7 and the light sources 30. The front glass 5, the distance plate 6 and the back plate 20 of the local dimming backlight unit 2 are connected by suitable connecting elements 10, e.g. gluing. In the example of FIG. 1, the local dimming backlight unit 2 provides essentially white light. To this end, the light sources 30 may emit white light. Alternatively, the light sources 30 may by monochromatic LEDs, e.g., LEDs emitting blue or violet light. In this case, the optical foil stack 7 includes a light conversion foil. A local dimming processor 11 is configured to adjust pixel values of images to be displayed. To this end, the local dimming processor 11 makes use of information related to white points of the light sources 30, which is stored in a memory 12 of the display device 1. The local dimming processor 11 as well as the memory 12 may likewise be located separate from the display device 1. For example, in a vehicle, it is possible to generate the image and the backlight driving information in a high performance computer directly adjusted for a local dimming display. In this situation, the display device simply uses the image and the backlight information generated in a different unit.

Figure 2:
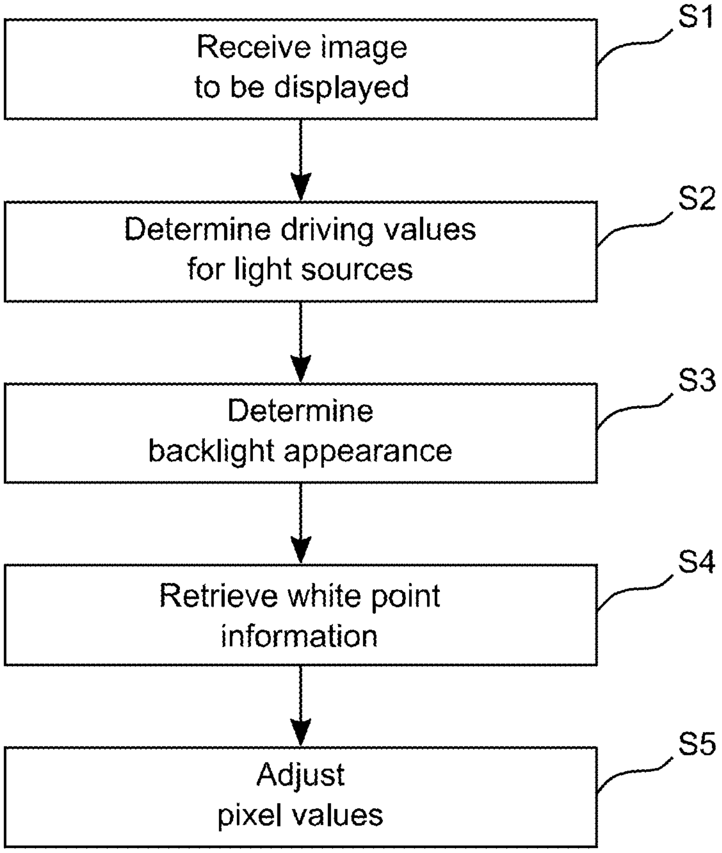
FIG. 2 schematically illustrates a method for processing an image to be displayed by a display device with a local dimming backlight unit.

FIG. 2 schematically illustrates a method for processing an image to be displayed by a display device with a local dimming backlight unit that provides essentially white light. In a first step, an image to be displayed is received S1. Driving values for light sources of the local dimming backlight unit are then determined S2 based on the image to be displayed. Based on the driving values, a backlight appearance is determined S3. Pixel values of the image are then adjusted S5 based on the backlight appearance. Information related to white points of the light sources is taken into account in the step of adjusting S5 pixel values of the image, which may be retrieved S4 from a map stored in a memory. For example, the information related to white points of the light sources may include calibration data, weights, or information related to color bins of the light sources. Adjusting S5 pixel values may include individually adjusting color channels of a pixel based at least on information related to a white point of a light source associated with a respective position of the pixel. A crosstalk matrix may be used for taking into account white points of neighboring light sources for adjusting S5 pixel values.

Figure 3:
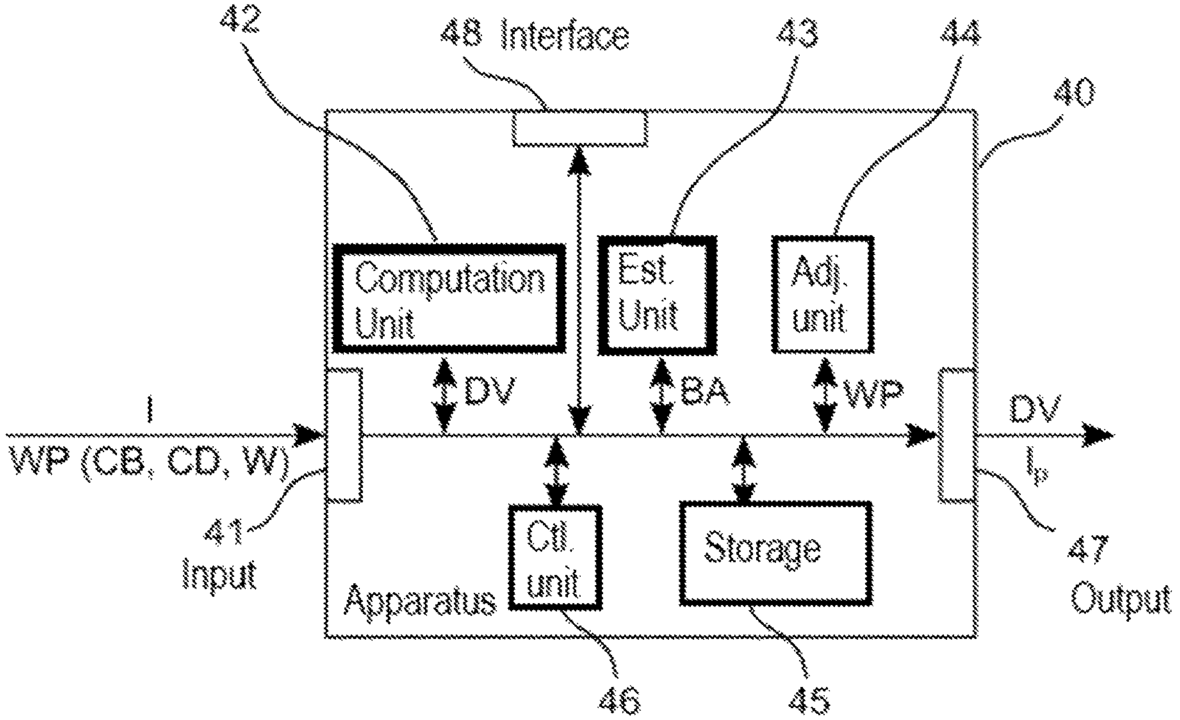
FIG. 3 schematically illustrates a first embodiment of an apparatus for processing an image to be displayed by a display device with a local dimming backlight unit.

FIG. 3 schematically illustrates a block diagram of a first embodiment of an apparatus 40 according to the disclosure for processing an image I to be displayed by a display device with a local dimming backlight unit that provides essentially white light. The apparatus 40 has an input 41, via which an image I to be displayed is received. A brightness computation unit 42 is configured to determine driving values DV for light sources of the local dimming backlight unit based on the image I to be displayed. An appearance estimation unit 43 is configured to determine a backlight appearance BA based on the driving values DV. A pixel adjustment unit 44 is configured to adjust pixel values of the image I based on the backlight appearance BA. Information related to white points WP of the light sources, which may be retrieved from a map stored in a memory, is taken into account by the pixel adjustment unit 44 for adjusting the pixel values of the image I. The memory may be part of the apparatus or of the display device or may be external of both. For example, the information related to white points WP of the light sources may include calibration data CD, weights W, or information related to color bins CB of the light sources. Adjusting pixel values may include individually adjusting color channels of a pixel based at least on information related to a white point WP of a light source associated with a respective position of the pixel. A crosstalk matrix may be used for taking into account white points WP of neighboring light sources for adjusting pixel values. The resulting processed image $I_p$ as well as the driving values DV are made available via an output 47 of the apparatus 40. The output 47 may be combined with the input 41 into a single interface. A local storage unit 46 is provided for storing data during processing.

The brightness computation unit 42, the appearance estimation unit 43, and the pixel adjustment unit 44 may be controlled by a control unit 45. A user interface 48 may be provided for enabling a user to modify settings of the brightness computation unit 42, the appearance estimation unit 43, the pixel adjustment unit 44, and the control unit 45. The brightness computation unit 42, the appearance estimation unit 43, the pixel adjustment unit 44, and the control unit 45 can be embodied as dedicated hardware units. Of course, they may likewise be fully or partially combined into a single unit or implemented as software running on a processor, e.g., a CPU or a GPU.

Figure 4:
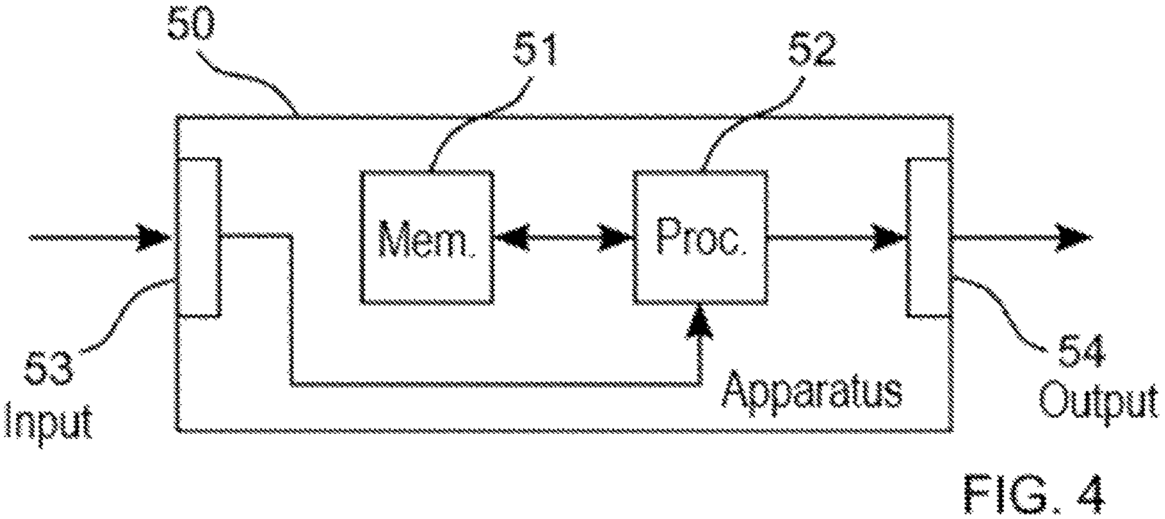
FIG. 4 schematically illustrates a second embodiment of an apparatus for processing an image to be displayed by a display device with a local dimming backlight unit.

A block diagram of a second embodiment of an apparatus 50 according to the invention for processing an image to be displayed by a display device with a local dimming backlight unit that provides essentially white light is illustrated in FIG. 4. The apparatus 50 comprises a processing device 52 and a memory device 51. For example, the apparatus 50 may be a computer or an embedded system. The memory device 51 has stored instructions that, when executed by the processing device 52, cause the apparatus 50 to perform steps according to one of the described methods. The instructions stored in the memory device 51 thus tangibly embody a program of instructions executable by the processing device 52 to perform program steps as described herein according to the present principles. The apparatus 50 has an input 53 for receiving data. Data generated by the processing device 52 are made available via an output 54. In addition, such data may be stored in the memory device 51. The input 53 and the output 54 may be combined into a single bidirectional interface.

The processing device 52 as used herein may include one or more processing units, such as microprocessors, digital signal processors, or a combination thereof.

The local storage unit 46 and the memory device 51 may include volatile and/or non-volatile memory regions and storage devices such as hard disk drives, optical drives, and/or solid-state memories.

Figure 5:
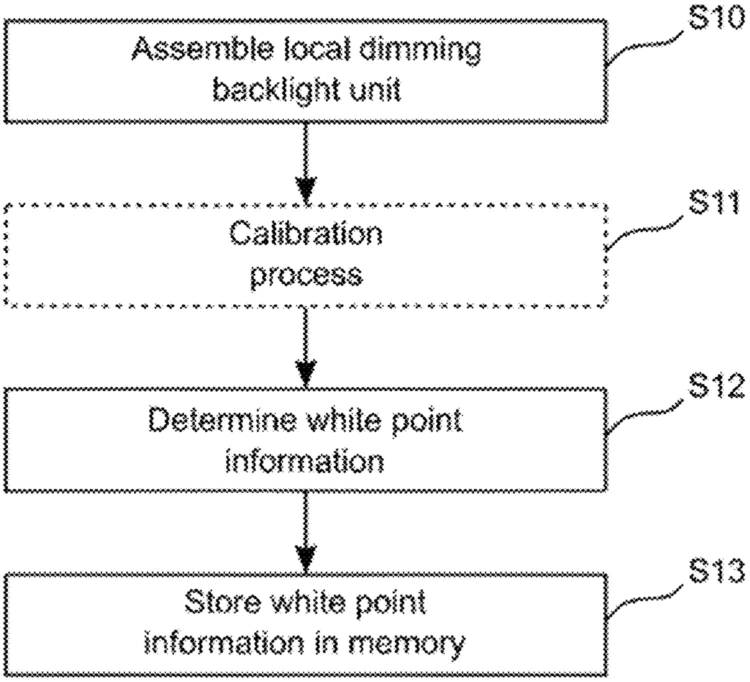
FIG. 5 schematically illustrates a method for manufacturing a display device with a local dimming backlight unit.

FIG. 5 schematically illustrates a method for manufacturing a display device with a local dimming backlight unit. During assembling S10 of the local dimming backlight unit or during a subsequent calibration process S11, information related to white points of light sources of the local dimming backlight unit is determined S12. The determined information is the stored S13 in a memory, e.g., as a map for the respective positions of the light source. For example, the information related to white points of the light sources may include calibration data, weights, or information related to color bins of the light sources.

Figure 6:
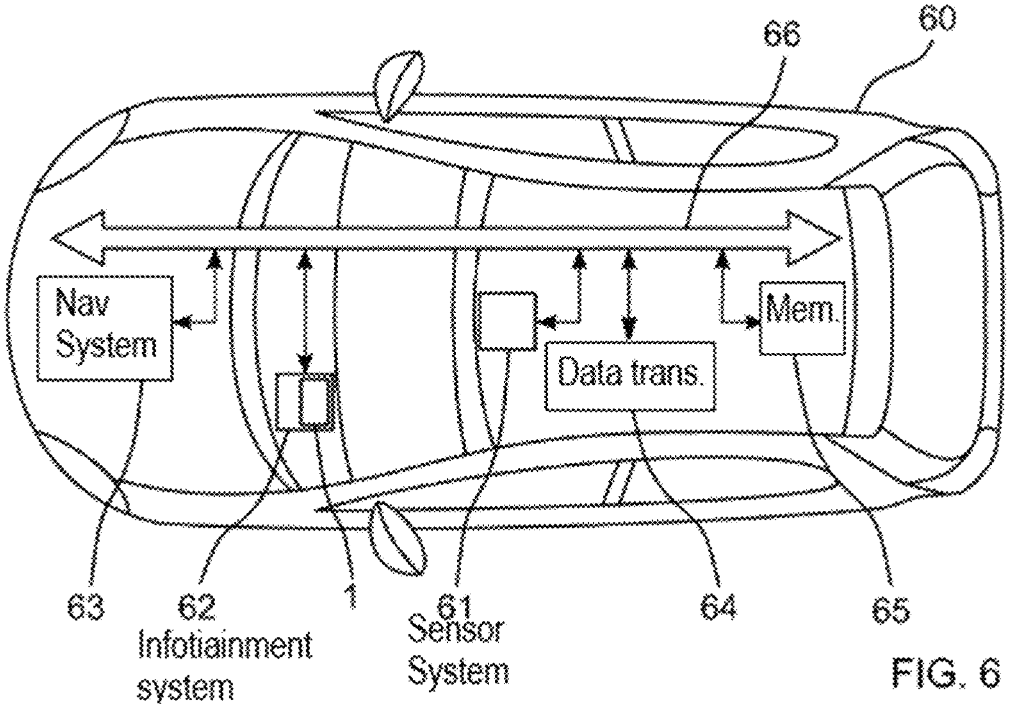
FIG. 6 schematically illustrates a motor vehicle in using a display device according to the disclosure.

FIG. 6 schematically shows a motor vehicle 60, which uses a display device 1 according to the disclosure. For example, the display device 1 may be arranged in a dashboard. The motor vehicle 60 in this example is a passenger car. With a sensor system 61, data on the vehicle environment can be recorded. The sensor system 61 may in particular include sensors for detecting the surroundings, e.g. ultrasonic sensors, laser scanners, radar sensors, lidar sensors or cameras. The information recorded by the sensor system 61 may be used to generate content for the display device 1 to be displayed. The display device 1 may be part of an infotainment system 62. Further components of the motor vehicle 60 in this example are a navigation system 63, through which position information can be provided, and a data transmission unit 64. Through the data transmission unit 64, a connection to a backend can be established, e.g. to receive software updates for the components of the motor vehicle 60. A memory 65 is available for storing data. The data exchange between the different components of the motor vehicle 60 takes place via a network 66.

Further details of the disclosure shall now be explained with reference to FIGS. 7 to 10.

Figure 7:
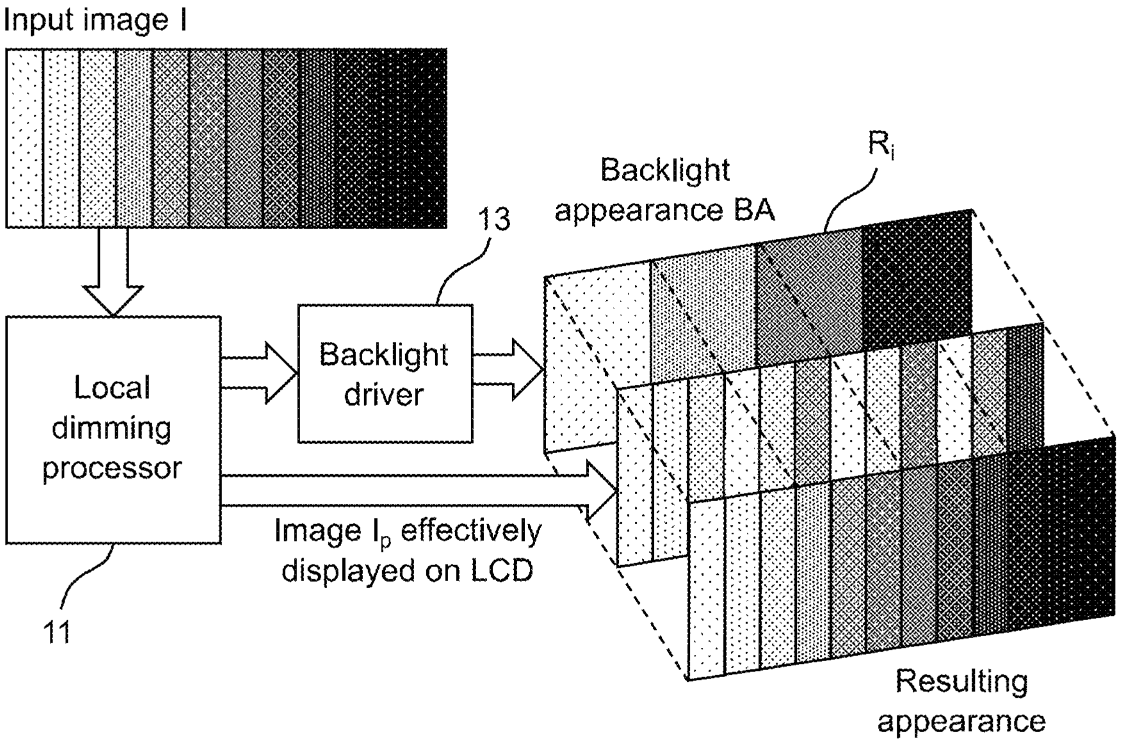
FIG. 7 illustrates at an abstract level a display with a local dimming backlight unit.

FIG. 7 illustrates at an abstract level a prior art display device 1 with a local dimming backlight unit. In this example, the backlight unit is divided into four regions $R_i$. The image I to be shown by the display device 1, i.e., the target image, consists of a gradient of several gray values. The local dimming processor 11 receives the input image I and, based on the input image I, calculates the required values for the individual backlight regions $R_i$. These values are sent to a backlight driver 13, which effectively drives the regions $R_i$ of the backlight unit to the required brightness values. Additionally, the local dimming processor 11 determines the processed image $I_p$ that needs to be effectively displayed on the display panel such that the resulting image produced by the entire assembly matches the appearance of the input image I.

In the figure, the brightness produced by each of the backlight regions R corresponds to the required brightness of the brightest vertical gray bar that is aligned with the given backlight region $R_i$. The input gray level gradient of the input image I has to be adjusted such that the combination of the brightness produced by the backlight unit and the display panel matches the required brightness of the input image I. Given the layout of the backlight unit, it can be seen that the processed image $I_p$ effectively shown on the display panel no longer presents a gradient, but a repeating pattern of highly transmissive bars followed by several bars with lower transmittance levels. The transmittance of all of the highly transmissive parts is identical, even if the corresponding gray bars from the input image I differ substantially. This is a direct result of the modulation of the brightness of the backlight areas.

Figure 8:
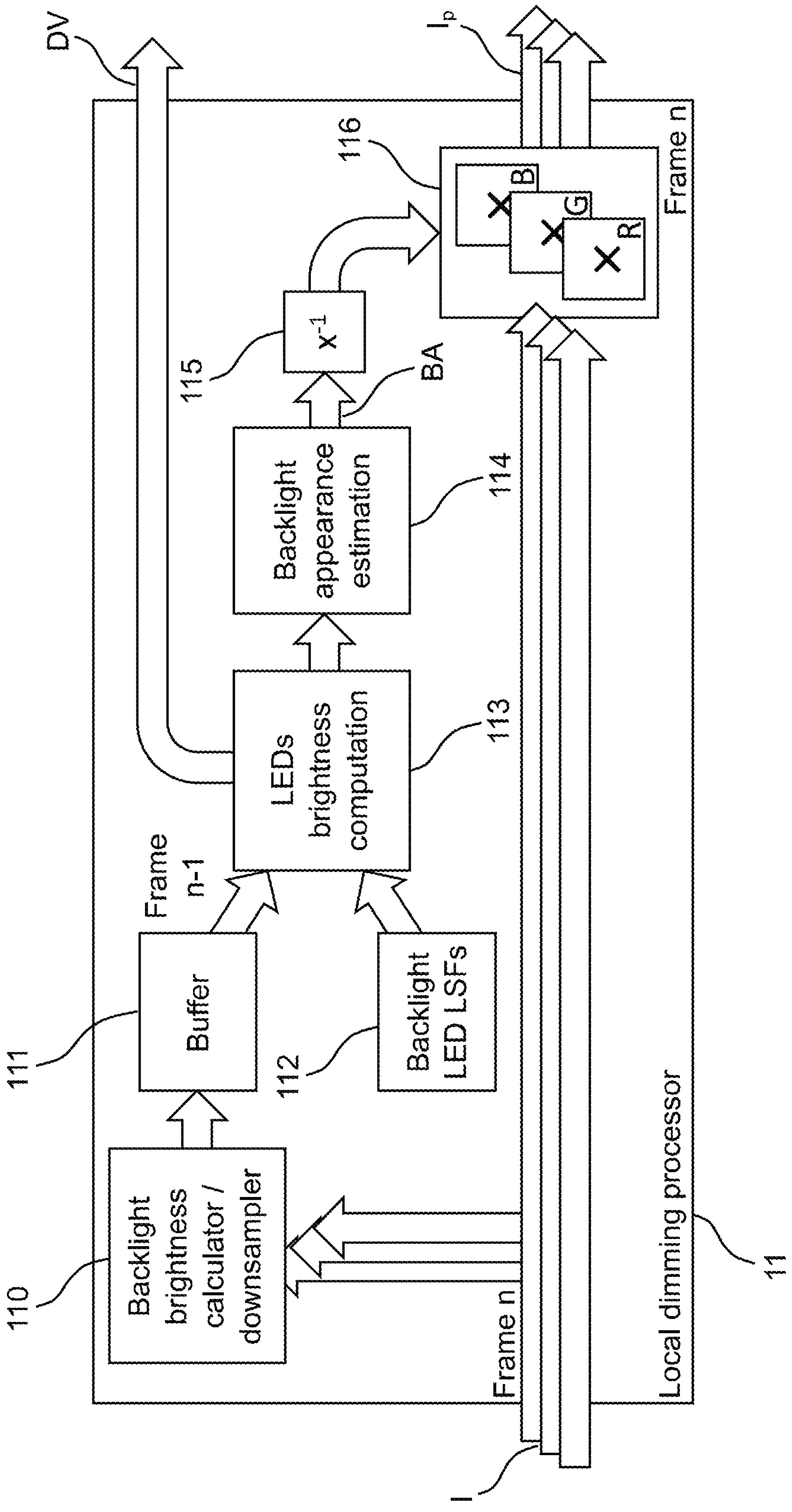
FIG. 8 depicts a simplified block diagram of a known local dimming processor.

FIG. 8 depicts a simplified block diagram of a known local dimming processor 11. In order to calculate the required driving values DV for the backlight unit, the local dimming processor 11 must first determine the brightness of the input image I corresponding to each of the backlight regions. Because, typically, the number of backlight regions is much lower than the number of pixels of the input image I, this determination can be performed together with a spatial downsampling operation. This allows a reduction in the processing requirements of the local dimming processor 11. In FIG. 8, the operation is performed by a backlight brightness calculator/downsampler block 110. The block 110 inspects the input image I in a subpixel-by-subpixel fashion and determines, which of the subpixels from a specific image area corresponding to an individual backlight region require the largest backlight intensity. This corresponds to the downsampling part, as only a subpixel from a given area is retained. The block 110 further determines the required backlight level for those subpixels, which corresponds to the brightness calculation part.

The results produced by the block 110 are then saved into a buffer 111. This buffer 111 is needed as the local dimming processor 11 can determine the appearance of the backlight only after the entire input image I has been received. This is mainly due to the crosstalk between adjacent backlight regions, which typically do not have sharp boundaries. A side effect of this buffering is that the output produced by the brightness calculator block 110 may only be used only for the next input frame. This is generally possible, as consecutive frames from a video stream typically are highly correlated. Only during scene changes the consecutive frames differ substantially.

In the next step, the local dimming processor 11 computes the driving values DV required by the LEDs from the backlight unit based on the buffered output of the backlight brightness calculator 110 and on the light spread functions (LSF) 112 of each individual backlight region. This operation is achieved by an LED brightness computation block 113. The LED driving values DV are sent to the driver of the backlight unit and to a backlight appearance estimator 114. The estimated backlight appearance BA is needed for the adjustment of the pixel data that is sent to the display panel. As already stated, without this adjustment, the image produced by the locally dimmed display will appear substantially different from the original input image I. This adjustment is performed by first estimating the reciprocal value of the estimated backlight unit brightness corresponding to the processed pixel, which is done by a reciprocal value estimator 115, and then multiplying this result with the digital code of each color channel from the processed pixel, which is done by a multiplication block 116. The resulting processed image $I_p$ is then provided output to the display panel. The estimated backlight appearance BA effectively acts as a spatial weight that is used for processing of the input color image in a color channel by color channel fashion, each color channel using the same computed weight for the given pixel, with neighboring pixels typically having slightly different weights due to the difference in the backlight appearance BA.

While in FIG. 8 a system operating with three distinct color channels is depicted, namely a red color channel, a green color channel, and a blue color channel, the described approach can likewise be extended to systems using different color primaries, such as red, green, blue, and white, or red, green, blue, and yellow.

Figure 9:
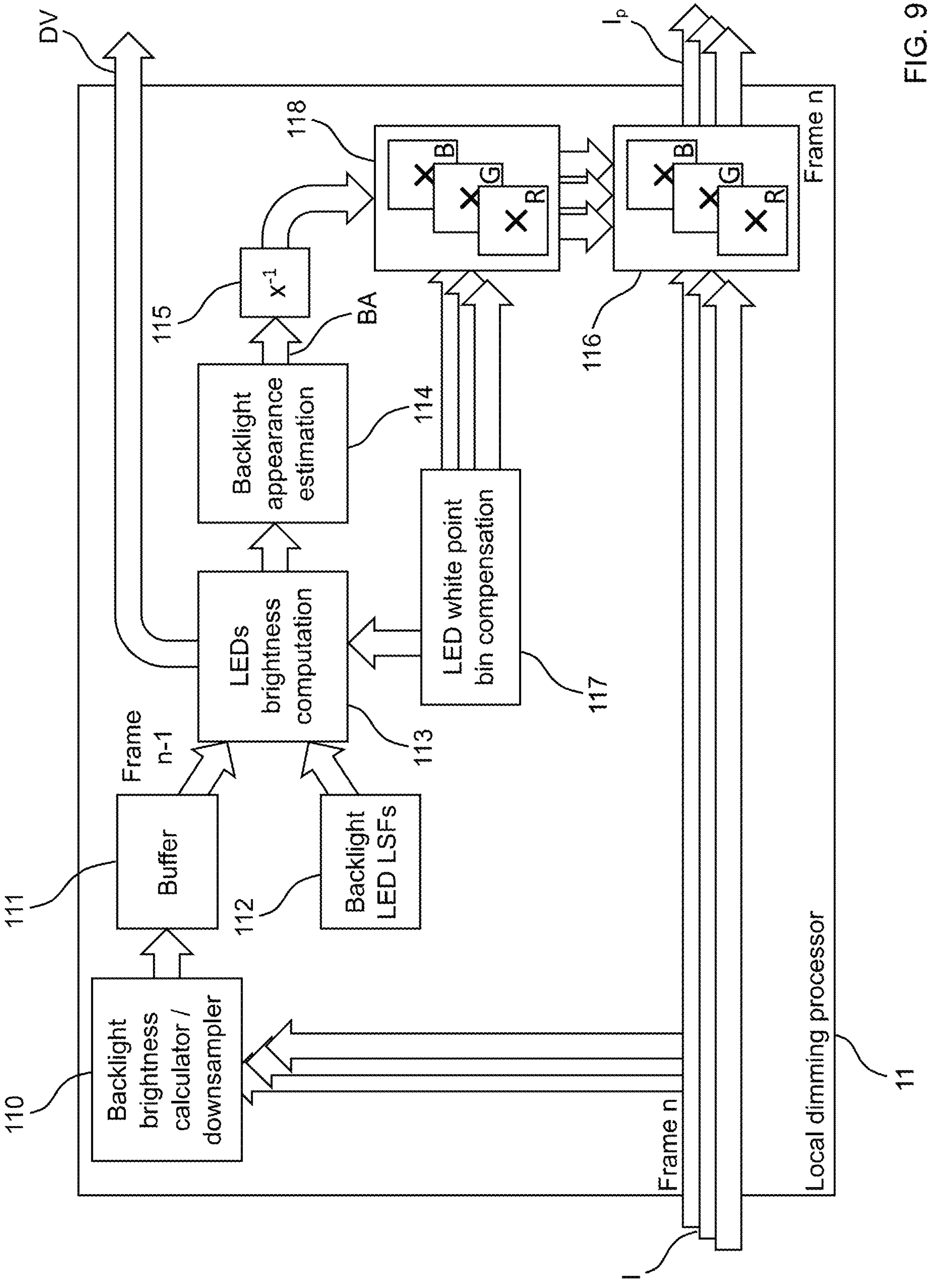
FIG. 9 depicts a simplified block diagram of a first implementation of a local dimming processor.

FIG. 9 depicts a simplified block diagram of a first implementation of a local dimming processor 11 implementing a solution according to the disclosure. As stated before, an important step performed by the local dimming processor 11 is adjusting the image that is to be sent to the display in such a way that the combination between the locally dimmed backlight and the image effectively shown on the display panel closely matches the appearance of the input image I. This processing step occurs after the local dimming processor 11 has estimated the backlight appearance BA based on the driving values DV of each LED and the light spread functions 112 of the same LEDs. In the system of FIG. 8, only the brightness information of the LEDs is used for the adjustment of the image to be displayed. The system of FIG. 9 uses a modification of this process step, in that also information about the specific color coordinates of the illuminated region is take into consideration when calculating the pixels of the image to be displayed corresponding to this same region.

As can be seen, the system of FIG. 9 comprises an additional LED white point bin compensation block 117 and an additional multiplication block 118 having three multipliers, with each multiplier working on a dedicated color channel. Of course, the described solution is not limited to particular color primaries. Furthermore, although hardware multiplier blocks 116, 118 are depicted, other approaches may be used, for instance using look-up tables.

The purpose of the additional LED white point bin compensation block 117 is to track which backlight region illuminates the current processed pixel and, based on the corresponding white point of the backlight region, which is given mainly by the LED color bin, to generate white point compensation coefficients CC for the current pixel. The white point compensation is preferably achieved by individually adjusting the color channels of the selected pixel. For instance, if the white point given by the LED illuminating the current pixel is shifted towards the blue color, the LED white point bin compensation block 117 generates for the current pixel a weight for the blue channel that is slightly lower than one, while the weights for the green and red channels are kept constant at one. In this way, the combination of the slightly bluer backlight and the pixel with a reduced amplitude on the blue channel generates a white point value which is close to a target value.

When the values of some of the color channels of a pixel are weighted with subunitary values, the transmittance of the pixel is slightly reduced. In order to maintain the brightness uniformity of the display panel, it is advantageous if the local dimming processor 11 also adjusts the backlight such that the overall brightness of the current pixel is kept at the same level as the brightness of the pixels from neighboring backlight regions. To this end, the LED white point bin compensation block 117 is also connected to the LED brightness computation block 113.

As stated before, the color coordinates, i.e., the white point, of the backlight depend on the color bins of the placed LEDs. However, it is generally possible to construct during the assembly or in a subsequent calibration processes a map with the positions of the LEDs and their respective color bin. This map is then used as input for the LED white point bin compensation block 117. In this way, based on the coordinates of each processed pixel, the block 117 can determine the color bin of the LED corresponding to the current pixel. With this information, the block 117 can determine the color channel weights for the processed pixel.

The map may be constructed as look-up table capable of storing values with a very short word length. For instance, in case the look-up table stores words having only 2 bits, a discrimination between four distinct LED color bins is possible. An additional bit for the word extends the capabilities to eight distinct LED color bins, which will be sufficient for the vast majority of local dimming applications. The stored words are then preferably used as inputs for an additional look-up table, which makes the correspondence between the digitally encoded color bins and the required white point compensation weights or brightness adjustment coefficients. It is up to the application how to digitally encode the LED color bins into these bits from the look-up table. Of course, it is likewise to possible to directly store the compensation weights or calibration data, such as the respective color coordinates of the LEDs, in the map.

The white point adjustment weights determined from the look-up table for the backlight area illuminating the currently processed pixel may be used directly for the adjustment of the pixel, which has the benefit of a simple circuit implementation and, hence, a low cost. Alternatively, they may be further combined with weights from neighboring areas using a crosstalk matrix. This variant produces a better uniformity of the white point, as light leakage, i.e., crosstalk, from adjacent areas is taken into consideration for the adjustment of the current pixel. This aspect is particularly relevant for neighboring backlight areas in which LEDs from different color bins are used.

The compensation of the white point by the local dimming processor 11 may be implemented in several different fashions. In a simple approach, one of the LED color bins is considered as a reference for the white point, e.g., the color bin that produces the final system white point closest to a desired target white point. For the remaining color bins, the white point compensation weights are determined in such a way as to bring the resulting white point of the system in the regions corresponding to the different LED color bins to the same color coordinates as the reference white point of the reference color bin. This determination may be done using a statistical approach. Based on the typical color coordinates of the different color bins, the weights are set to an average value such that, statistically, the resulting white point coincides with the reference white point, within some desired limits. With this approach, all LEDs from a same color bin will generate the same color compensation weights for all manufactured systems. Using this approach, the resulting locally dimmed display has a white point determined by the LED color bin that was considered as reference. If there is a requirement for the system to achieve a target white point, a calibration may be performed using the same method as for the state of the art systems in a separate step. In this way, the LED color bin compensation and the system white point calibration are two independent functions. Furthermore, the use of statistical data for the LED color bin compensation requires no calibration step in the production line, so there is no time penalty for this method. The resulting non-uniformity of the global white point is given by the spread of the color coordinates in the color bin relative to the statistical average.

Another possibility to realize the white point compensation is to perform a multi-step white point calibration procedure. This is useful when the entire system must be brought to a desired white point that is different from any of the white points generated by the LED color bins. In this approach, the calibration process advantageously performs individual calibrations for each LED color bin, such that the white points created by each of the LED color bins coincide with the desired target white point. Using the LED map determined during the LED assembly, the calibration process first illuminates all LEDs from a same color bin while the remaining LEDs are switched off. In this configuration, the calibration process determines the necessary weight for bringing the actual white point given by the selected color bin to the target white point. In subsequent steps, the calibration process repeats the same calibration for the other color bins, in a one by one fashion. In this way, the calibration process will determine specific weights for all of the LED color bins. In this approach, none of the LED color bins is considered as a reference. The LED color bin compensation and the system white point calibration constitute a single indivisible step. While there is a proportional increase in the duration of the calibration process when the number of LED color bins that are used increases, a benefit of this approach is that each individual system that is manufactured is calibrated as closely as possible to the target white point, with smaller errors compared to the previously described approach using statistical data.

Of course, also other white point compensation approaches may be used. For instance, it is possible to combine the two above described approaches. The backlight is first brought to a relatively uniform appearance using statistical data for the LED color bins and then the weights are further refined during a white point calibration. Another possibility is to consider not just one LED color bin as a reference, but two or more. The remaining LED color bins will be compensated using statistical data such that the resulting white points will by as close as possible to one of the reference bins. The compensated display will appear as if only the reference color bins where used. In the end, the display is brought to a final white point using the multi-step white point calibration procedure, in which only the remaining equivalent color bins are compensated. For instance, assuming a system using four LED color bins, two of these can be considered as refence bins. The other two LED color bins will be compensated by matching one to the first reference color bin and the other one to the other reference color bin. The backlight will thus appear as if only the two reference color bins were placed so, the multi-step white point calibration will perform only two calibrations for the two equivalent LED color bins instead of four calibrations for the four original color bins. In this way, the duration of the multi-step calibration process is reduced to half of the original duration.

Figure 10:
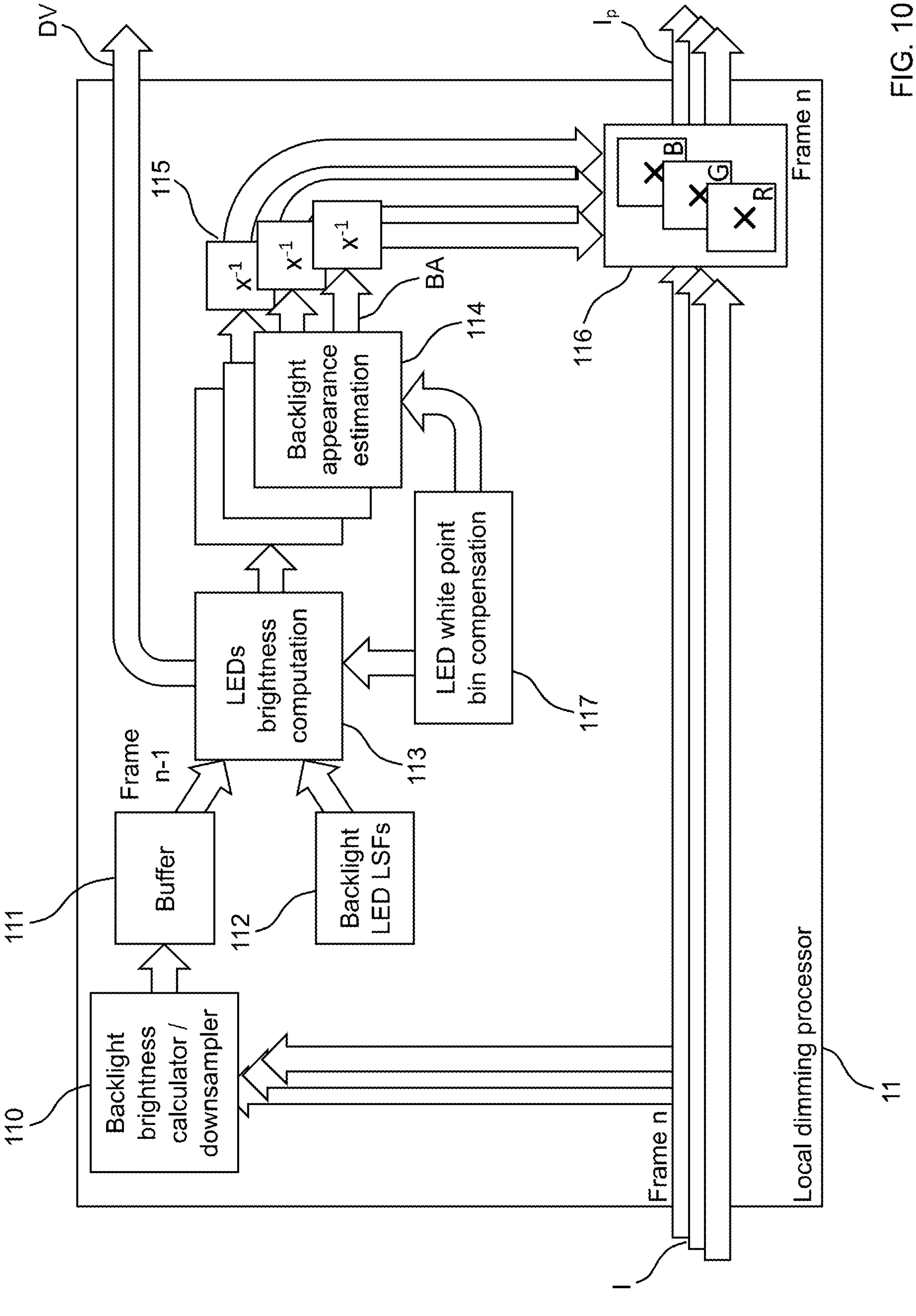
FIG. 10 depicts a simplified block diagram of a second implementation of a local dimming processor.

FIG. 10 depicts a simplified block diagram of a second implementation of a local dimming processor 11. In this implementation of the local dimming processor 11, the backlight appearance BA is directly estimated as a color image, computed based on the color properties of the LED color bins. An advantage of this approach is that the interaction between different backlight regions is computed in the same step both for the brightness and the white point. In addition, three multipliers operating with a data rate given by the pixel clock can be omitted. To this end, the backlight appearance estimator 114 and the reciprocal value estimator 115 need to be constructed, for a standard system using the red, green, and blue color primaries, with three independent channels, which requires an increased silicon area of the local dimming processor 11.

The invention claimed is:

1. A method for processing an image to be displayed by a display device with a local dimming backlight unit that provides essentially white light, comprising:

receiving an image to be displayed;

determining driving values for light sources of the local dimming backlight unit based on the image to be displayed;

determining a backlight appearance based on the driving values; and adjusting pixel values of the image based on the backlight appearance;

wherein information related to white points of the light sources is taken into account in the step of adjusting pixel values of the image, and wherein adjusting pixel values includes individually adjusting color channels of a pixel based at least on information related to a white point of a light source associated with a respective position of the pixel.

2. The method according to claim 1, wherein the information related to white points of the light sources is retrieved from a map stored in a memory.

3. The method according to claim 1, wherein the information related to white points of the light sources includes calibration data, weights, or information related to color bins of the light sources.

4. The method according to claim 3, wherein one of the color bins is considered as a white point reference.

5. The method according to claim 3, wherein the weights result from a statistical approach.

6. The method according to claim 1, wherein a crosstalk matrix is used for taking into account white points of neighboring light sources for adjusting pixel values.

7. A computer program code comprising instructions, which, when executed by at least one processor, cause the at least one processor to perform a method for processing an image to be displayed by a display device, the method comprising:

receiving an image to be displayed;

determining driving values for light sources of a local dimming backlight unit based on the image to be displayed;

determining a backlight appearance based on the driving values; and adjusting pixel values of the image based on the backlight appearance;

wherein information related to white points of the light sources is taken into account in the step of adjusting pixel values of the image, and wherein adjusting pixel values includes individually adjusting color channels of a pixel based at least on information related to a white point of a light source associated with a respective position of the pixel.

8. An apparatus for processing an image to be displayed by a display device with a local dimming backlight unit that provides essentially white light, comprising:

an input for receiving an image to be displayed; a brightness computation unit for determining driving values for light sources of the local dimming backlight unit based on the image to be displayed;

an appearance estimation unit for determining a backlight appearance based on the driving values; and a pixel adjustment unit for adjusting pixel values of the image based on the backlight appearance;

wherein information related to white points of the light sources is taken into account by the pixel adjustment unit for adjusting pixel values of the image, and wherein adjusting pixel values includes individually adjusting color channels of a pixel based at least on information related to a white point of a light source associated with a respective position of the pixel.

9. A method for manufacturing a display device with a local dimming backlight unit that provides essentially white light, comprising:

determining information related to white points of light sources of the local dimming backlight unit;

and storing the determined information in a memory; and adjusting pixel values, which includes individually adjusting color channels of a pixel based at least on information related to the white point of a light source associated with a respective position of the pixel.

10. The method according to claim 9, wherein the information related to white points of the light sources includes calibration data, weights, or information related to color bins of the light sources.

11. The method according to claim 10, wherein one of the color bins is considered as a reference for the white points.

12. The method according to claim 10, wherein the weights are determined using a statistical approach.

13. A display device, the display device comprising:

a local dimming backlight unit that provides essentially white light, wherein the display device is configured to access a memory that stores information related to white points of light sources of the local dimming backlight unit;

wherein information related to the white points of the light sources is taken into account in the step of adjusting pixel values of the image, and wherein adjusting pixel values includes individually adjusting color channels of a pixel based at least on information related to a white point of a light source associated with a respective position of the pixel.

14. A display device according to claim 13, wherein the display device is located within a motor vehicle.

* * * * *